United States Patent
Park

(10) Patent No.: US 9,274,983 B2
(45) Date of Patent: Mar. 1, 2016

(54) MEMORY SYSTEMS INCLUDING NONVOLATILE BUFFERING AND METHODS OF OPERATING THE SAME

(71) Applicant: Samsung Electronics Co., Ltd., Suwon-si (KR)

(72) Inventor: KwangSoo Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/326,898

(22) Filed: Jul. 9, 2014

(65) Prior Publication Data

US 2015/0138884 A1 May 21, 2015

(30) Foreign Application Priority Data

Nov. 18, 2013 (KR) .................. 10-2013-0140128

(51) Int. Cl.
*G11C 11/34* (2006.01)
*G06F 13/16* (2006.01)

(52) U.S. Cl.
CPC ...................... *G06F 13/16* (2013.01)

(58) Field of Classification Search
CPC ...... G11C 7/222; G11C 16/10; G11C 11/005; G11C 11/406; G11C 11/40603; G11C 11/40607; G11C 11/412; G11C 16/26; G11C 16/32; G11C 29/70; G11C 5/02; G11C 5/025; G11C 5/04; G11C 14/0018; G11C 14/0063
USPC ........... 365/230.03, 185.08, 185.11; 711/167, 711/E12.002, 100, 103
See application file for complete search history.

(56) References Cited

U.S. PATENT DOCUMENTS

| | | |
|---|---|---|
| 4,916,670 A | 4/1990 | Suzuki et al. |
| 6,639,820 B1 | 10/2003 | Khandekar et al. |
| 7,451,263 B2 | 11/2008 | Oh et al. |
| 8,516,219 B2 | 8/2013 | Post et al. |
| 8,554,990 B2 | 10/2013 | Kwon et al. |
| 2010/0191896 A1 | 7/2010 | Yang et al. |
| 2010/0299513 A1 | 11/2010 | Ryu et al. |
| 2012/0246392 A1 | 9/2012 | Cheon |
| 2012/0297231 A1* | 11/2012 | Qawami et al. ............... 713/400 |
| 2013/0042054 A1 | 2/2013 | Jung et al. |

* cited by examiner

*Primary Examiner* — Thong Q Le
(74) *Attorney, Agent, or Firm* — Myers Bigel Sibley & Sajovec, P.A.

(57) ABSTRACT

A nonvolatile memory system can include a nonvolatile memory device that can be configured to store data and a nonvolatile memory buffer circuit that can be configured to store data of a type that is predetermined to be flushed to the nonvolatile memory device in a sudden power off backup operation of the nonvolatile memory system, whereas a volatile memory buffer circuit can be configured to store other data of a type that is not to be flushed to the nonvolatile memory device in the sudden power off backup operation of the nonvolatile memory system. A memory controller can be coupled to the nonvolatile memory device, the nonvolatile memory buffer circuit, and to the volatile memory buffer circuit, where the memory controller can be configured to store received data or processed data in the nonvolatile memory buffer circuit responsive to determining that the received data or processed data is of the type that is predetermined to be flushed to the nonvolatile memory device in the sudden power off backup operation of the nonvolatile memory system.

20 Claims, 13 Drawing Sheets

MEMORY SYSTEMS INCLUDING NONVOLATILE BUFFERING AND METHODS OF OPERATING THE SAME

CROSS-REFERENCE TO RELATED APPLICATIONS

The present application claims priority under 35 U.S.C. §119 to Korean Patent Application No. 10-2013-0140128 filed Nov. 18, 2013, in the Korean Intellectual Property Office, the entire contents of which are hereby incorporated by reference.

BACKGROUND

The inventive concept described herein relates to semiconductor memories, and more particularly, to nonvolatile memory systems and methods of operating such systems.

A semiconductor memory device can be fabricated using semiconductors such as silicon (Si), germanium (Ge), gallium arsenide (GaAs), indium phosphide (InP), and the like. Semiconductor memory devices can be classified into volatile memory devices and nonvolatile memory devices.

A volatile memory device such as a Static RAM (Static Random Access Memory), a Dynamic RAM (DRAM), a Synchronous DRAM (SDRAM), etc. may lose stored data when power to the memory is lost. A nonvolatile memory device such as a Read Only Memory (ROM), a Programmable ROM (PROM), an Electrically Programmable ROM (EPROM), an Electrically Erasable and Programmable ROM (EEPROM), a flash memory device, a Phase-change RAM (PRAM), a Magnetic RAM (MRAM), a Resistive RAM (RERAM), a Ferroelectric RAM (FRAM), etc. may retain stored data even when power is lost.

A flash memory-based solid state drive (hereinafter, referred to as "SSD") is used in some applications. An SSD may operate at a faster speed, lower noise and lower power than a conventional hard disk drive. An SSD may also incorporate a DRAM as a buffer memory. However, because a DRAM is a volatile memory, it may be needed to copy or flush data (e.g., mapping table, metadata, etc.) stored in the DRAM into the flash memory when a sudden power-off occurs (SPO). This operation may be referred to as an SPO backup operation, and may utilize an auxiliary power device (such as a tantalum capacitor, a super capacitor, or a battery).

SUMMARY

Embodiments according to the inventive concept can provide memory systems including nonvolatile buffering and methods of operating the same. Pursuant to these embodiments, a nonvolatile memory system can include a nonvolatile memory device that can be configured to store data, and/or a nonvolatile memory buffer circuit that can be configured to store data of a type that is predetermined to be flushed to the nonvolatile memory device in a sudden power off backup operation of the nonvolatile memory system, whereas a volatile memory buffer circuit can be configured to store other data of a type that is not to be flushed to the nonvolatile memory device in the sudden power off backup operation of the nonvolatile memory system. A memory controller can be coupled to the nonvolatile memory device, to the nonvolatile memory buffer circuit via a channel, and to the volatile memory buffer circuit via the channel, where the memory controller can be configured to store received data and/or processed data in the nonvolatile memory buffer circuit responsive to determining that the received data and/or processed data is of the type that is predetermined to be flushed to the nonvolatile memory device in the sudden power off backup operation of the nonvolatile memory system.

In some embodiments according to the inventive concept, the memory controller can be configured to determine that the received data and/or the processed data is of the type that is predetermined to be flushed to the nonvolatile memory device in the sudden power off backup operation of the nonvolatile memory system using an attribute of the received data and/or the processed data. In some embodiments according to the inventive concept, the attribute of the received data and/or the processed data indicates that the received data and/or the processed data is file system data, metadata, and/or mapping data.

In some embodiments according to the inventive concept, the memory controller can be further configured to store received data and/or processed data in the volatile memory buffer circuit responsive to determining that the received data and/or processed data is of the type that is not to be flushed to the nonvolatile memory device in the sudden power off backup operation of the nonvolatile memory system.

In some embodiments according to the inventive concept, the nonvolatile memory buffer circuit and/or the volatile memory buffer circuit can include a respective channel adaptor circuit that can be configured to process signals received over the channel to a protocol used by the nonvolatile memory buffer circuit and/or the volatile memory buffer circuit.

In some embodiments according to the inventive concept, a nonvolatile memory system can include a nonvolatile memory device and a memory controller that can be configured to receive data from an external device or from the nonvolatile memory device in response to a request from the external device to provide received data. The memory controller can be configured to determine one or more attributes of the received data and/or an attribute of processed data generated through processing of the received data, and configured to generate first and second memory selection signals based on the attributes of the received data and/or processed data determined by the memory controller. A buffer circuit can be configured to temporarily store data under control of the memory controller, where the buffer circuit can include a first buffer memory that can be configured to communicate with the memory controller through a buffer channel, and the first buffer memory can be configured to temporarily store the received data and/or the processed data in response to the first memory selection signal and under control of the memory controller. A second buffer memory can be configured to communicate with the memory controller through the buffer channel, and the second buffer memory can be configured to temporarily store the received data and/or the processed data responsive to the second memory selection signal under control of the memory controller, where the first buffer memory can be a volatile random access memory and the second buffer memory can be a nonvolatile random access memory.

In some embodiments according to the inventive concept, a method of operating a nonvolatile memory system that includes a nonvolatile memory device coupled to a first buffer memory and to a second buffer memory can include receiving data from an external device and/or the nonvolatile memory device in response to a request from the external device. An attribute of the data can be determined to provide a determination result and the received data can be temporarily stored in the first buffer and/or the second buffer memory through a buffer channel based on the determination result, where the first buffer memory can be a volatile random access memory and the second buffer memory can be a nonvolatile random access memory.

DETAILED DESCRIPTION

Figure 1:
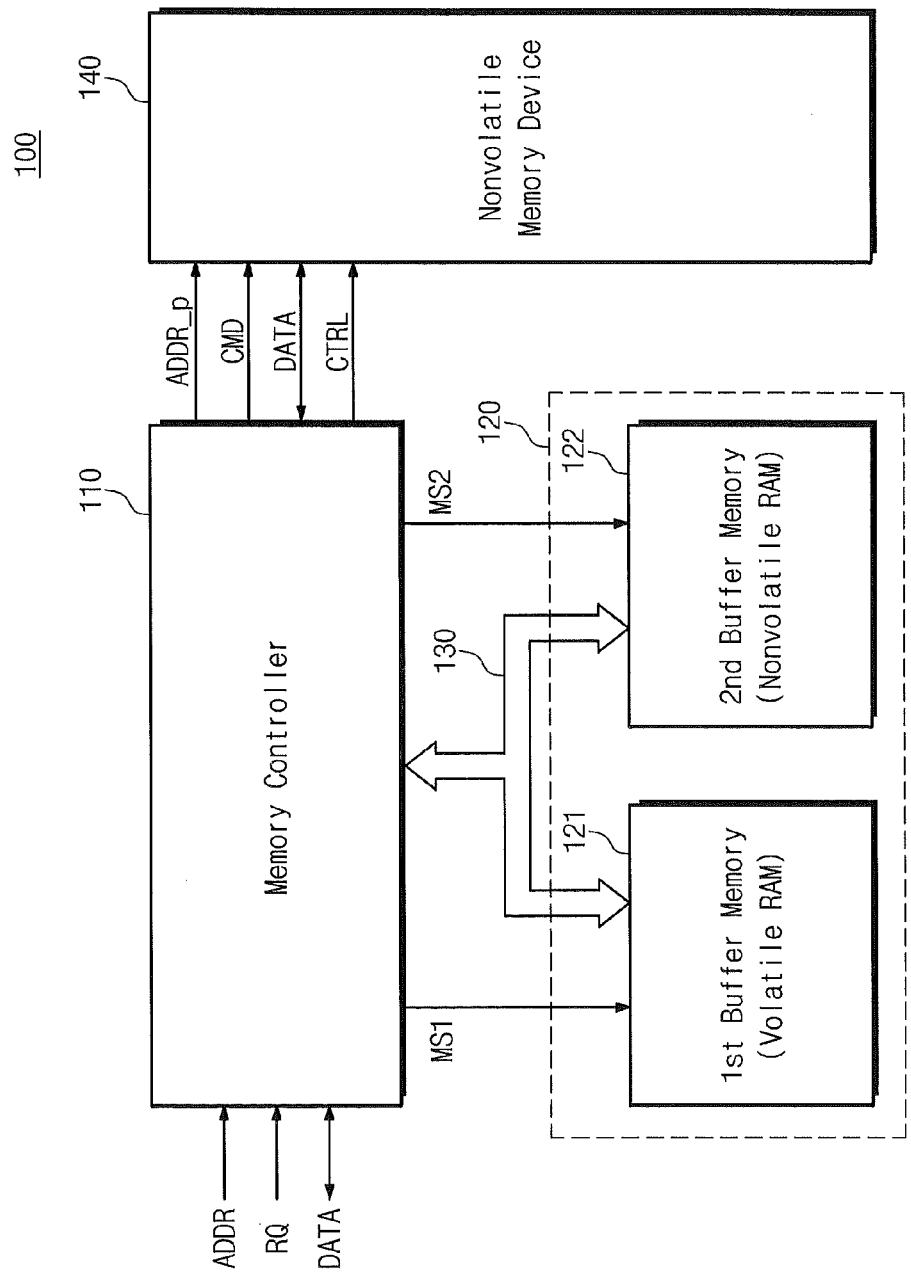
FIG. 1 is a block diagram illustrating a nonvolatile memory system according to embodiments of the inventive concept.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present inventive subject matter belongs. It will be further understood that terms used herein should be interpreted as having a meaning that is consistent with their meaning in the context of this specification and the relevant art and are not to be interpreted in an idealized or overly formal sense unless expressly so defined herein. The term "plurality" is used herein to refer to two or more of the referenced item.

A nonvolatile memory system according to embodiments of the inventive concept may include a memory controller, a first buffer memory being a volatile memory, and a second buffer memory being a nonvolatile memory. The memory controller may temporarily store data in the first and second buffer memories. The memory controller may determine an attribute of data to be temporarily stored in a buffer memory and may selectively store data in the first and/or second buffer memory based on the determined attribute of the data. For example, important data such as mapping table data and metadata may be stored in the second buffer memory (nonvolatile memory). Accordingly, when a sudden loss of power occurs, important data that is stored in the nonvolatile memory may not need to be flushed to, for example, a flash memory as the important data is already held in the nonvolatile memory. This use of the nonvolatile memory to temporarily store certain types of important data may help reduce the need for a power source for use during SPO back up operation or even the need for an SPO back up operation all together.

FIG. 1 is a block diagram illustrating a nonvolatile memory system 100 according to embodiments of the inventive concept. In operation, when the first and second memory selection signals MS1 and MS2 are at a logical high, the first and second buffer memories 121 and 122 are respectively activated. Also, when the first and second memory selection signals MS1 and MS2 are at a logical low, the first and second buffer memories 121 and 122 are respectively inactivated. However, the scope of the inventive concept is not limited thereto. For example, a buffer memory may be activated in response to memory selection signal being logically low.

Referring to FIG. 1, the nonvolatile memory system 100 includes a memory controller 110, a buffer unit 120, and a nonvolatile memory device 140. The memory controller 110 receives an address ADDR and an input request RQ from a host. The memory controller 110 exchanges data with the host. The memory controller 110 writes data to the nonvolatile memory device 140 or reads data from the nonvolatile memory device 140 in response to the input request RQ. The memory controller 110 converts the input address ADDR into a physical address ADDR_p. For example, the memory controller 110 may convert an address ADDR received from the host into a physical address ADDR_p that the nonvolatile memory device 140 can use in the Flash Translation Layer (FTL).

The memory controller 110 provides the nonvolatile memory device 140 with the physical address ADDR_p, a command CMD, and a control signal CTRL in response to the input request RQ. The memory controller 110 exchanges data with the nonvolatile memory device 140.

The memory controller 110 temporarily stores data received from the host or the nonvolatile memory device 140 in the buffer unit 120 through a buffer channel 130.

The buffer unit 120 is a buffer memory for compensating for a speed difference between the host and the nonvolatile memory system 100. The buffer unit 120 temporarily stores data received from the host or the nonvolatile memory device 140. For example, the buffer unit 120 receives data from the memory controller 110 to be written to the nonvolatile memory device 140. The buffer unit 120 temporarily stores the data received from the host. The memory controller 110 can then provide the temporarily stored data to the nonvolatile memory device 140.

The buffer unit 120 includes the first and second buffer memories 121 and 122. The first and second buffer memories 121 and 122 temporarily store data received from the host or the nonvolatile memory device 140. The first and second buffer memories 121 and 122 may store data (e.g., a mapping table generated by a flash translation layer) generated according to an operation of the memory controller 110.

In some embodiments, the first and second buffer memories 121 and 122 may be different types of random access memories. For example, the first buffer memory 121 can be a volatile RAM such as a Static RAM (SRAM), a Dynamic RAM (DRAM), or a Synchronous DRAM (SDRAM), whereas the second buffer memory 122 can be a nonvolatile RAM such as a Phase-change RAM (PRAM), a Magnetic RAM (MRAM), a Resistive RAM (RRAM), or a Ferroelectric RAM (FRAM). In some embodiments, data stored in the second buffer memory 122 may not be lost even if power to the system 100 is interrupted.

The first and second buffer memories 121 and 122 communicate with the memory controller 110 through the buffer channel 130. For example, the first and second buffer memories 121 and 122 exchange signals (e.g., data, a command, and a buffer address) with the memory controller 110 through the buffer channel 130. In other words, the first and second buffer memories 121 and 122 can share the same channel. In some embodiments, the buffer channel 130 may include signal lines such as data lines, an address line, and/or a command line. In some embodiments, the buffer channel 130 may have a DRAM interface.

The nonvolatile memory device 140 receives a physical address ADDR_p, a command CMD, and a control signal CTRL from the memory controller 110. The nonvolatile memory device 140 exchanges data with the memory controller 110. The nonvolatile memory device 140 stores write data or outputs stored data in response to input signals. In exemplary embodiments, the nonvolatile memory device 140 may be based on a flash memory.

In some embodiments, the memory controller 110 determines one or more attributes of data to be temporarily stored in the buffer unit 120. For example, the memory controller 110 may determine whether data to be temporarily stored is included in a predetermined data group. In some embodiments, the predetermined data group may include important data such as a host's file system, metadata, mapping data, and the like. In some embodiments, the predetermined data group may include data generated by an operation of the memory controller 110. In some embodiments, a data attribute may be information indicating whether data is included in the predetermined data group.

In some embodiments, the memory controller 110 determines the data attribute(s) based on an address ADDR received from the host. For example, a boot loader of the host may have a specific address. That is, the memory controller 110 may determine whether an address ADDR received from the host is a specific address (or within a range of specific addresses), which may form the basis of the data attribute of data received from the host.

In some embodiments, the memory controller 110 may determine the data attribute(s) based on a header of data. However, the inventive concepts are not limited thereto. For example, a method of determining the data attribute(s) may be implemented in a variety of program or hardware forms.

In some embodiments, data to be temporarily stored in the buffer unit 120 may be data received from the host and/or the nonvolatile memory device 140 and/or data generated during operations of the memory controller 110.

The memory controller 110 generates the first and second memory selection signals MS1 and MS2 based on the determined attribute(s) of the data. For example, when data to be temporarily stored in the buffer unit 120 is included in the predetermined data group, the first memory selection signal MS1 and the second memory selection signal MS2 are set to a logical low and a logical high respectively, so that the first buffer memory is deactivated and the second buffer memory is activated. On the other hand, when data to be temporarily stored in the buffer unit 120 is not included in the predetermined data group, the first memory selection signal MS1 and the second memory selection signal MS2 may be set to a logical high and a logical low, respectively, so that only the first buffer memory is activated.

In some embodiments, the predetermined data group may include a host's file system, metadata indicative of data information, and data (e.g., mapping data) generated during operations of the memory controller 110.

The first and second buffer memories 121 and 122 receive the first and second memory selection signals MS1 and MS2 from the memory controller 110, respectively. The first and second buffer memories 121 and 122 are activated or inactivated by the first and second memory selection signals MS1 and MS2, respectively. For example, an activated buffer memory may temporarily store data, while an inactivated buffer memory may not store the data.

The first buffer memory 121 receives the first memory selection signal MS1. When the first memory selection signal MS1 is at a logical high, the first buffer memory 121 is enabled to operate responsive to the memory controller 110. When the first memory selection signal MS1 is at a logical low, the first buffer memory 121 is disabled.

The second buffer memory 122 receives the second memory selection signal MS2. When the second memory selection signal MS2 is at a logical high, the second buffer memory 122 is enabled to operate responsive to the memory controller 110. When the second memory selection signal MS2 is at a logical low, the second buffer memory 122 is disabled.

The first and second memory selection signals MS1 and MS2 may be respectively transferred to the first and second buffer memories 121 and 122 through the buffer channel 130.

As described above, the memory controller 110 determines one or more attributes of data to be temporarily stored and stores the data in the first or second buffer memory 121 or 122 based on that determination. That is in some embodiments, data included in the predetermined data group is stored in the second buffer memory 122 (a nonvolatile memory), so that an SPO backup operation may not be required even when a sudden power-off occurs. This may mean that an auxiliary power device such as a tantalum capacitor, a super capacitor, or a battery may not be required for the SPO backup. Thus, a nonvolatile memory system having improved reliability and a reduced area may be provided.

Figure 2:
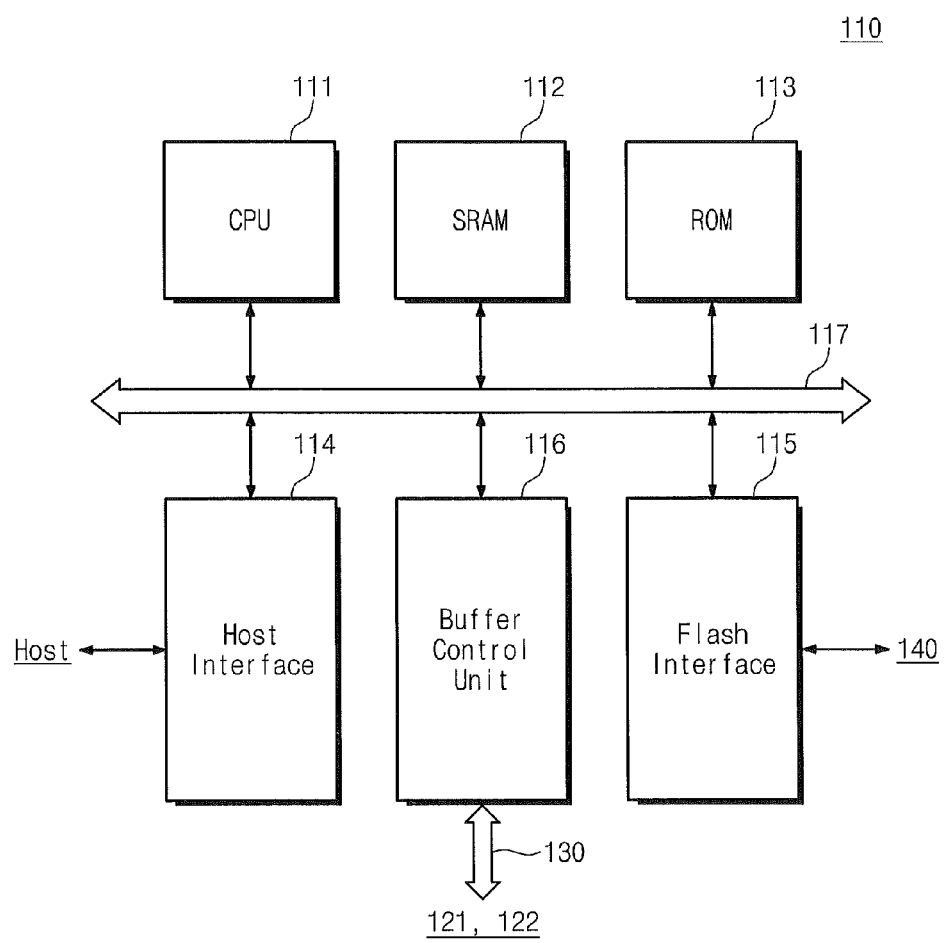
FIG. 2 is a block diagram illustrating the memory controller shown in FIG. 1.

FIG. 2 is a block diagram illustrating the memory controller shown in FIG. 1. Referring to FIGS. 1 and 2, the memory controller 110 includes a Central Processing Unit (CPU) 111, an SRAM 112, a ROM 113, a host interface 114, a flash interface 115, a buffer control unit 116, and a system bus 117.

The CPU 111 controls overall operations of the memory controller 110. The CPU 111 processes data received through the host interface 114 and the flash interface 115 and generates processed data. In some embodiments, the processed data may be mapping information between a logical address received from a host and a physical address of a nonvolatile memory device 140. Alternatively, the processed data may be data generated during operations of the CPU 111.

The SRAM 112 may be a cache memory, a temporary memory, or a buffer memory. The ROM 113 stores data or programs for operations of the memory controller 110. Data or programs stored in the ROM 113 may be provided as firmware.

In some embodiments, a data attribute determination operation of the memory controller 110 may be executed by the CPU 111 based on firmware stored in the ROM 113, The CPU 111 generates data attribute information DA based on a determination result.

In some embodiments, the CPU 111 may determine a data attribute based on an address ADDR received from a host. For example, a boot loader of the host may have a specific address. In the event that an address ADDR received from the host is a specific address, data may be determined to be included a predetermined data group. However, the inventive concept is not limited thereto. A data attribute determination method may be variously modified or changed. Such methods may be stored in the ROM 113 as firmware.

The memory controller 110 communicates with the host based on the host interface 114. The memory controller 110 communicates with the nonvolatile memory device 140 based on the flash interface 115.

The buffer control unit 116 controls the first and second buffer memories 121 and 122. For example, the buffer control unit 116 communicates with the first and second buffer memories 121 and 122 using the buffer channel 130. The buffer control unit 116 generates the first and second memory selection signals MS1 and MS2 based on the data attribute information DA and transmits the first and second memory selection signals MS1 and MS2 to the first and second buffer memories 121 and 122, respectively. An operation of the buffer control unit 116 is further described with reference to, for example, FIG. 4.

The system bus 117 is connected to components of the memory controller 110 to provide a data transfer channel. In some embodiments, the buffer control unit 116 may receive the data attribute information DA through the system bus 117 from the CPU 111.

Figure 3:
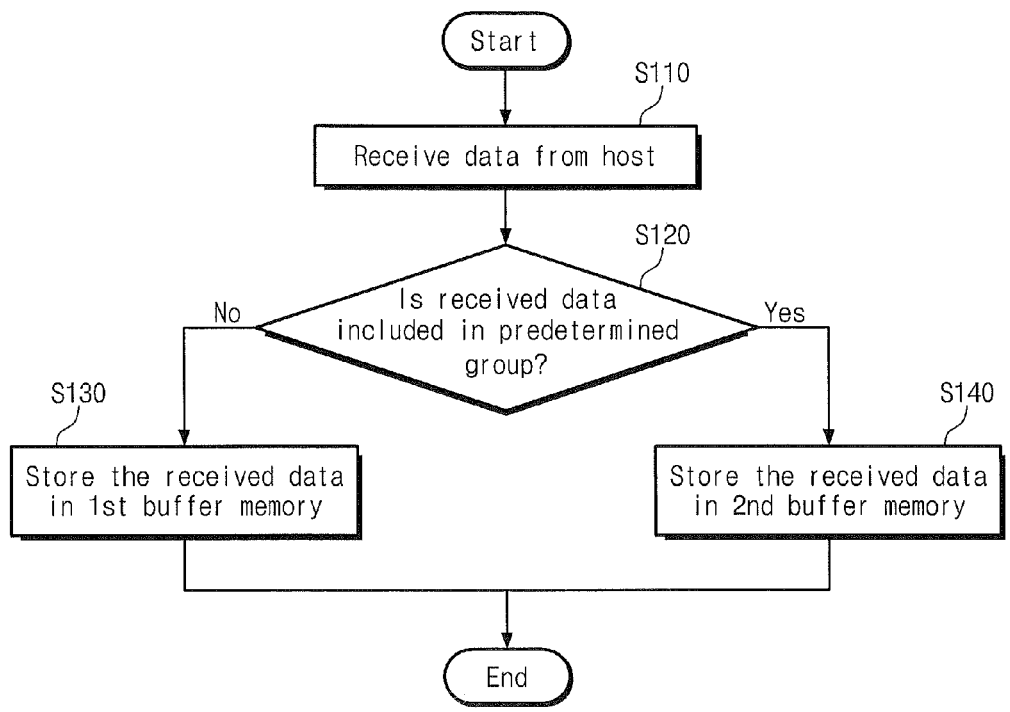
FIG. 3 is a flowchart illustrating operations of the memory controller shown in FIG. 2.

FIG. 3 is a flowchart illustrating operations of the memory controller shown in FIG. 2. For ease of description, it is assumed that a memory controller 110 receives data from a host or a nonvolatile memory device 140 and determines an attribute of the input data. However, the inventive concepts are not limited thereto. For example, the memory controller 110 may determine one or more attributes of processed data (e.g., a mapping table) generated by the CPU 111 and performs an operation shown in FIG. 3 according to the determined result.

Referring to FIGS. 1 to 3, in step S110, the memory controller 110 receives data from a host. In step S120, the memory controller 110 determines whether the received data is included in a predetermined data group. For example, the memory controller 110 may read a header of the received data and determine whether the received data is included in the predetermined data group based on the data's header.

As a consequence of determining that the received data is not included in the predetermined data group, in step S130, the memory controller 110 stores received data in the first buffer memory 121. As a consequence of determining that the received data is included in the predetermined data group, in step S140, the memory controller 110 stores the received data in the second buffer memory 122.

In some embodiments, data generated during an operation of the memory controller 110 may also be stored in the first or second buffer memory 121 or 122 based on the determination result of step S120. Alternatively, data read from the nonvolatile memory device 140 may also be stored in the first or second buffer memory 121 or 122 based on the determination result of step S120.

In some embodiments, a determination operation of the memory controller 110 may be performed by a software layer. Operations for the determination operation of the memory controller 110 may be stored in the ROM 113 as firmware, and the CPU 111 may perform the determination operation based on the firmware stored in the ROM 113.

Figure 4:
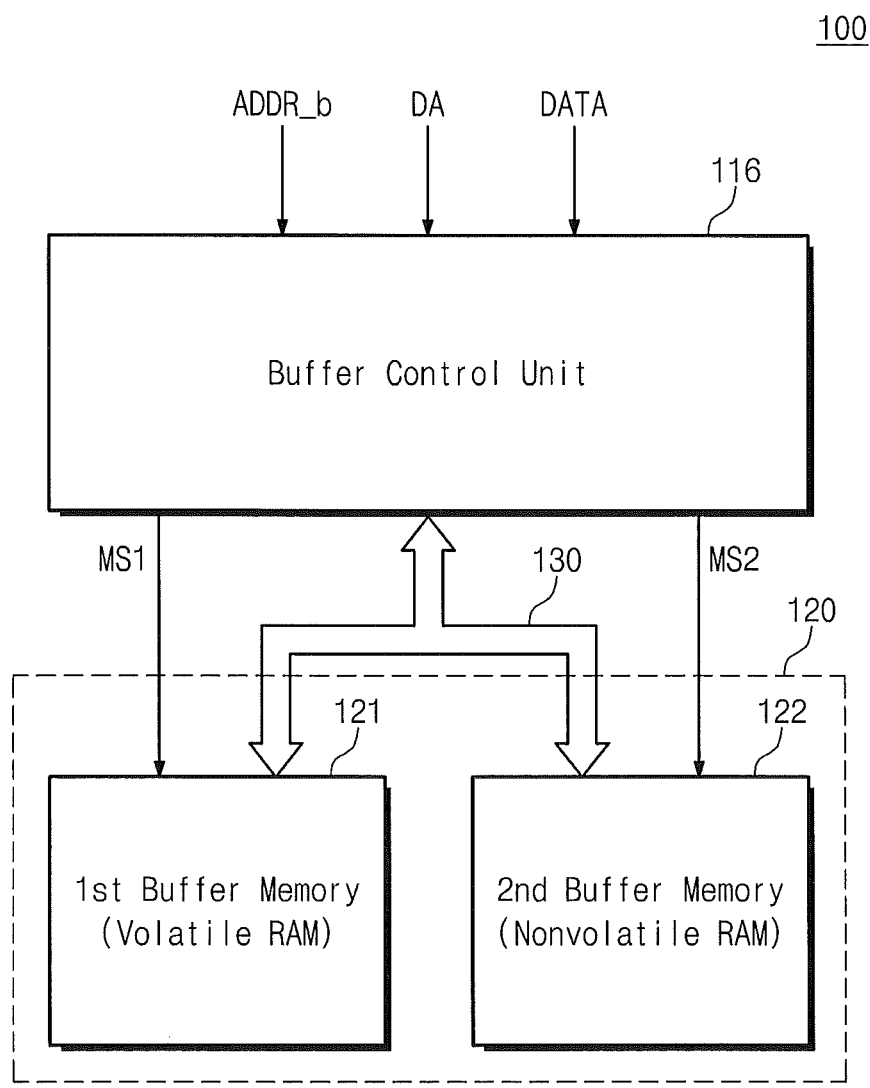
FIG. 4 is a block diagram describing operations of the buffer control unit shown in FIG. 2.

FIG. 4 is a block diagram describing operations of the buffer control unit 116 shown in FIG. 2.

Referring to FIGS. 2 and 4, the buffer control unit 116 receives buffer address ADDR_b, data, and data attribute information DA from the CPU 111. For example, during a write operation of the nonvolatile memory system 100, the CPU 111 determines one or more attributes of data received from a host to generate the data attribute information DA. The data attribute information DA may be information indicative of whether the received data is included in a predetermined data group. The CPU 111 allocates a buffer space in which data is temporarily stored. The CPU 111 sends the buffer address ADDR_b of the allocated buffer space to the buffer control unit 116.

The buffer control unit 116 generates first and second memory selection signals MS1 and MS2 based on the data attribute information DA. The buffer control unit 116 transmits the first and second memory selection signals MS1 and MS2 to the first and second buffer memories 121 and 122, respectively. The first and second buffer memories 121 and 122 are enabled or disabled according to the states of the first and second memory selection signals MS1 and MS2, respectively.

The buffer control unit 116 controls the first and second buffer memories 121 and 122 through the buffer channel 130 based on input signals. For example, the buffer control unit 116 transfers the received data and buffer address ADDR_b through the buffer channel 130.

An enabled one of the first and second buffer memories 121 and 122 operates based on the data and the buffer address ADDR_b received through the buffer channel 130. For example, in some embodiments, when the first memory selection signal MS1 is a logical high, the first buffer memory 121 is activated to store data in an area corresponding to the buffer address ADDR_b, and when the second memory selection signal MS2 is a logical high, the second buffer memory 122 is activated to store data in an area of the second buffer memory 122 corresponding to the buffer address ADDR_b. In such embodiments, when the first memory selection signal MS1 is a logical low, the first buffer memory 121 is disabled, and when the second memory selection signal MS2 is a logical low, the second buffer memory 122 is disabled.

Figure 5:
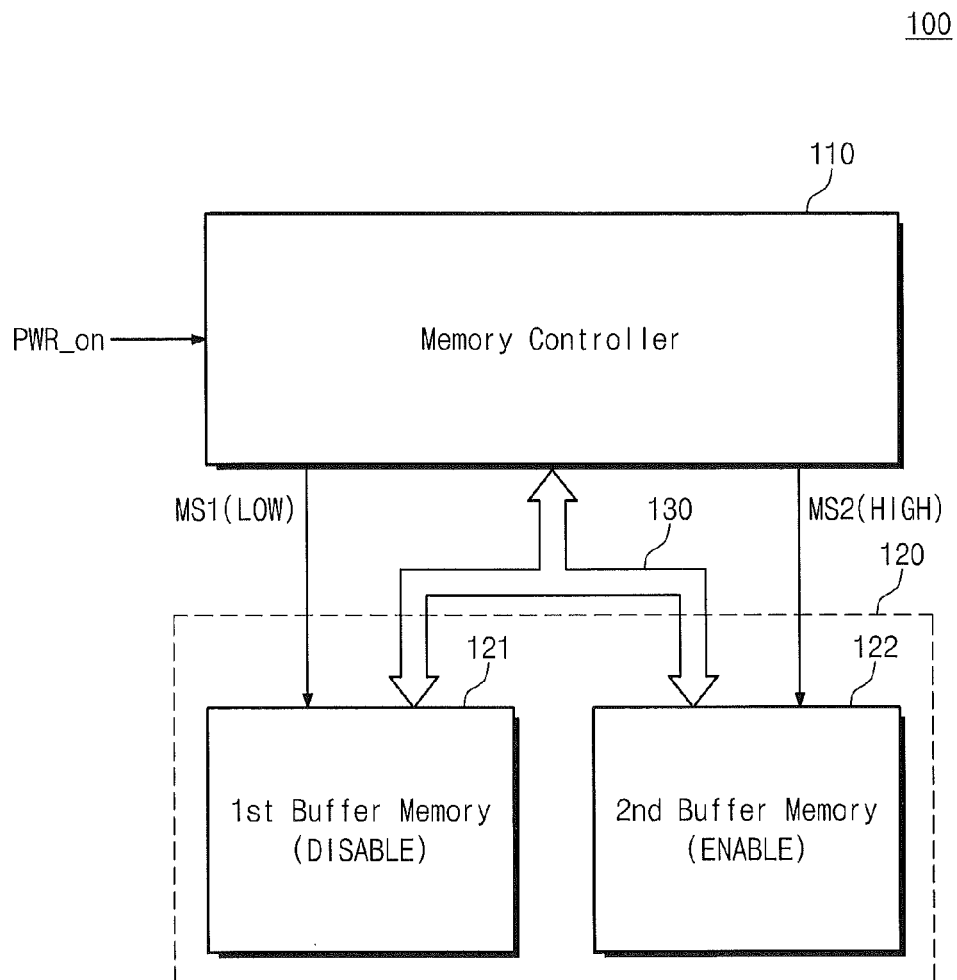
FIG. 5 is a block diagram describing a power-on operation of the nonvolatile memory system shown in FIG. 1.

FIG. 5 is a block diagram illustrating power-on operations of the nonvolatile memory system 100 shown in FIG. 1. Referring to FIG. 5, the memory controller 110 receives a power-on signal PWR_on from a host. The memory controller 110 performs a booting operation of the nonvolatile memory system 100 in response to the power-on signal PWR_on. In some embodiments according to the inventive concept, the second buffer memory 122 may be implemented as nonvolatile RAM and may store data included in a predetermined data group.

During booting, the memory controller 110 reads data stored in the second buffer memory 122 and boots the nonvolatile memory system based on the read data. For example, the second buffer memory 122 may include mapping data generated by a flash translation layer. The memory controller 110 reads the mapping data stored in the second buffer memory 122 and operates based on the read mapping data.

In some embodiments, the second buffer memory 122 may store file system data received from the host. The memory controller 110 reads the file system data to transfer it to the host.

As described above, a loss of data may be prevented by storing data included in the predetermined data group, in the second buffer memory 122 being a nonvolatile RAM. Since an SPO backup operation to flush mapping data and metadata is not performed when a sudden power-off occurs, an auxiliary power device such as a tantalum capacitor, a super capacitor, or a battery is not required. Thus, a nonvolatile memory system having a reduced area and improved performance may be provided.

Figure 6:
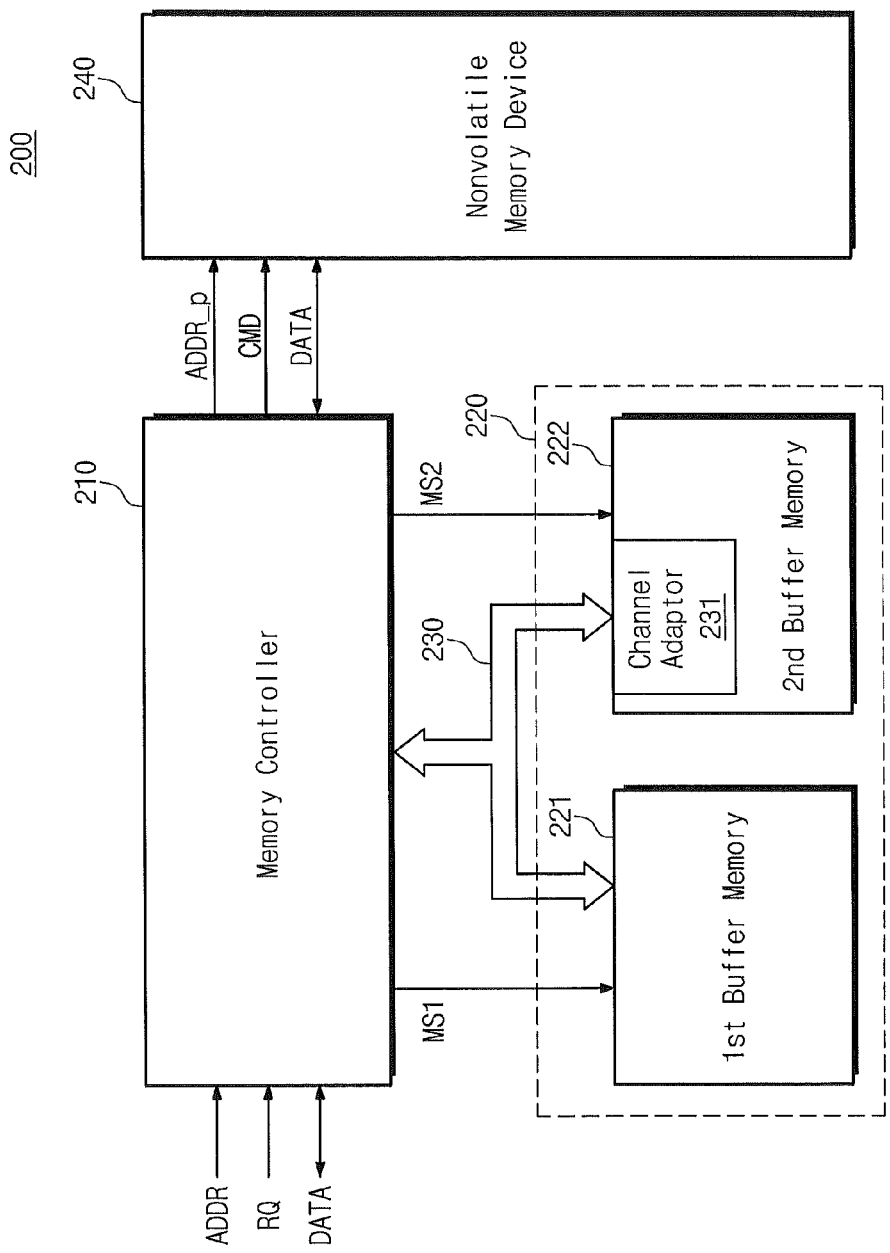
FIG. 6 is a block diagram illustrating a nonvolatile memory system according to embodiments of the inventive concept.

FIG. 6 is a block diagram illustrating a nonvolatile memory system 200 according to some embodiments of the inventive concept. Referring to FIG. 6, the nonvolatile memory system 200 includes a memory controller 210, a buffer unit 220, and a nonvolatile memory device 240. The buffer unit 220 includes first and second buffer memories 221 and 222, all of which can operate as described in reference to analogous components shown in, for example, FIG. 1.

Unlike the second buffer memory 122 shown in FIG. 1, however, the second buffer memory 222 shown in FIG. 6 further comprises a channel adaptor 231. The channel adaptor 231 converts signals received through the buffer channel 230 such that the second buffer memory 222 operates responsive to signals received through the buffer channel 230. In some embodiments, the first buffer memory 221 may be a DRAM. The buffer channel 230 may have a DRAM interface. The second buffer memory 222 may be a nonvolatile RAM such as an MRAM, ReRAM, PRAM, or FRAM. The first buffer memory 221 operates responsive to signals received through the buffer channel 230. The channel adaptor 231 converts the signals received through the buffer channel 230 into signals used at the second buffer memory 222. The second buffer memory 222 operates responsive to the signals received through the buffer channel 230.

With the current embodiments of the inventive concept, the second buffer memory 222 includes the channel adaptor 231 that converts signals received through the buffer channel 230 such that the second buffer memory 222 operates responsive to signals received through the buffer channel 230. Thus, the first and second buffer memories 221 and 222 share a common interface, but may operate differently.

Also, by storing data included in the predetermined data group in the second buffer memory 222 an auxiliary power device may not be required. Thus, a nonvolatile memory system 200 having improved reliability and a reduced area may be provided.

Figure 7:
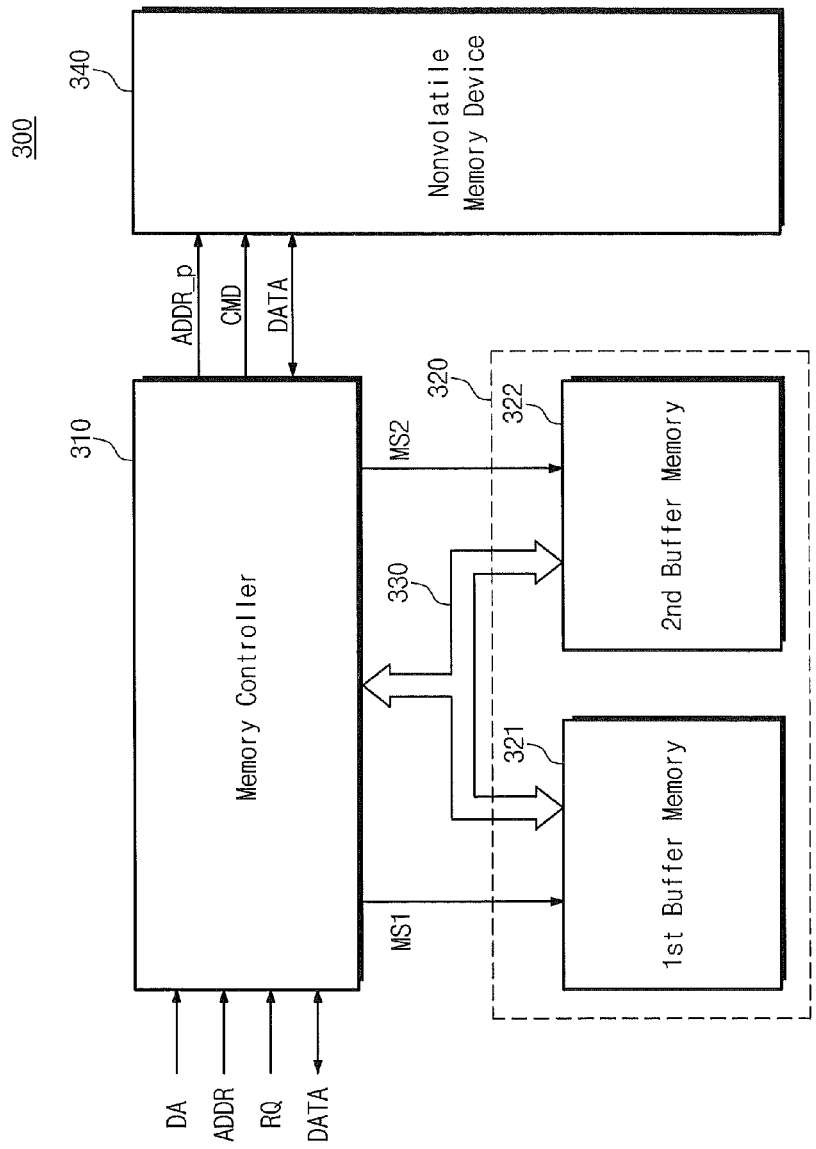
FIG. 7 is a block diagram illustrating a nonvolatile memory system according to embodiments of the inventive concept.

FIG. 7 is a block diagram illustrating a nonvolatile memory system 300 according to some embodiments of the inventive concept. Referring to FIG. 7, the nonvolatile memory system 300 includes a memory controller 310, a buffer unit 320, and a nonvolatile memory device 340. The buffer unit 320 includes first and second buffer memories 321 and 322. Operations and structures of the components 310, 321, 322, and 340 are described, for example, with reference to FIG. 1.

Unlike the memory controller 110 shown in FIG. 1, however, the memory controller 310 shown in FIG. 7 further receives data attribute information DA from a host. The memory controller 310 generates first and second memory selection signals MS1 and MS2 based on the data attribute information DA. In some embodiments, the data attribute information DA may be information indicating whether data is included in a predetermined data group. In some embodiments, the data attribute information DA may be generated from an application layer, a file system, or a HBA (Host Bus Adaptor) of the host.

Figure 8:
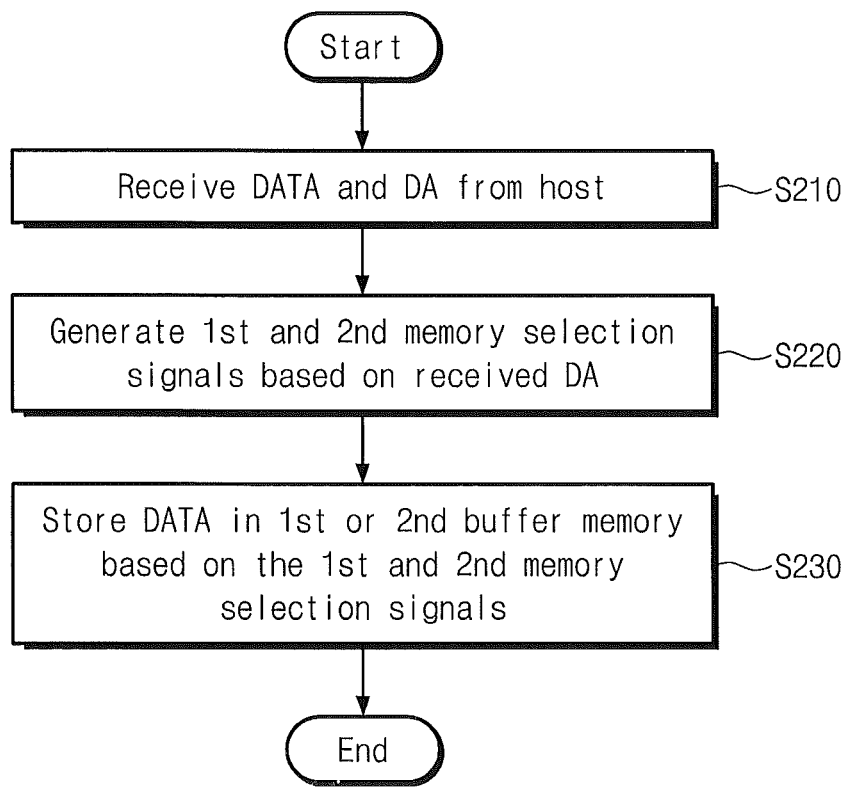
FIG. 8 is a flowchart illustrating operations of the memory controller shown in FIG. 7.

[FIG. 8 is a flowchart illustrating operations of the memory controller 310 shown in FIG. 7. Referring to FIGS. 6 and 7, in step S210, the memory controller 310 receives data and data attribute information DA from a host. In some embodiments, the data attribute information DA may be generated from an application layer, a file system, or a HBA (Host Bus Adaptor) of the host.

In step S220, the memory controller 310 generates first and second memory selection signals MS1 and MS2 based on the data attribute information DA. When the data attribute information DA indicates that data is included in a predetermined data group, the memory controller 310 sets the first memory selection signal MS1 to a logical low and the second memory selection signal MS2 to a logical high. When the data attribute information DA indicates that data is not included in the predetermined data group, the memory controller 310 sets the first memory selection signal MS1 to a logical high and the second memory selection signal MS2 to a logical low.

In step S230, the memory controller 310 stores data selectively in the first and second buffer memories 321 and 322 based on the first and second memory selection signals MS1 and MS2.

Accordingly, the memory controller 310 may selectively store data in the first or second buffer memory 321 or 322 based on the data attribute information DA received from the host. Since an auxiliary power device for an SPO backup operation may not be required, a nonvolatile memory system having improved reliability and a reduced area may be provided.

Figure 9:
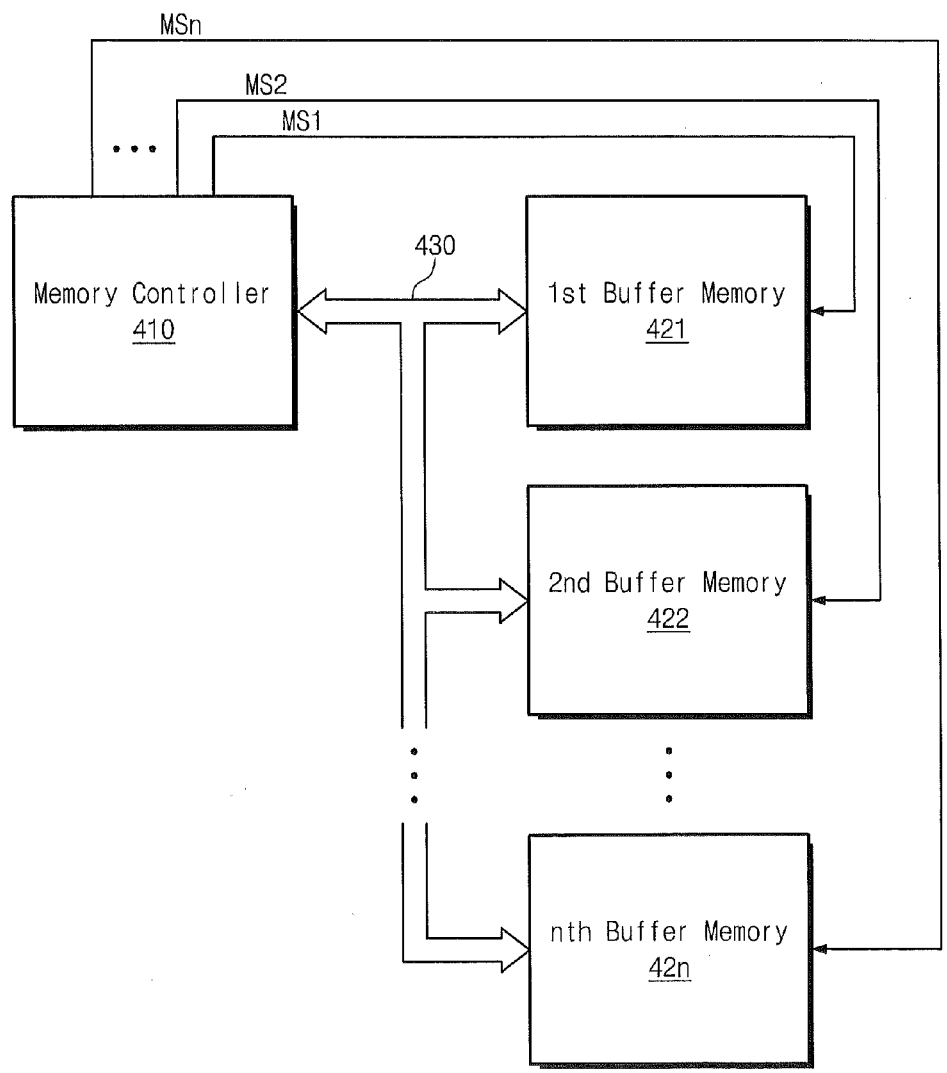
FIG. 9 is a block diagram illustrating a memory controller and a plurality of buffer memories according to embodiments of the inventive concept.

FIG. 9 is a block diagram illustrating a nonvolatile memory system 400, a memory controller 410 and a plurality of buffer memories 421, 422, 42n according to some embodiments of the inventive concept. Referring to FIG. 9, the nonvolatile memory system 400 includes a memory controller 410 and first to nth buffer memories 421 to 42n. The memory controller 410 communicates with the first to nth buffer memories 421 to 42n through a buffer channel 430. The memory controller 410 is connected to the first to nth buffer memories 421 to 42n through one interface (e.g., one buffer channel).

The first to nth buffer memories 421 to 42n may store data received from a host, data received from a nonvolatile memory device, and/or data generated during operations of the memory controller 410. Each of the first to nth buffer memories 421 to 42n may be a volatile RAM or a nonvolatile RAM.

The memory controller 410 generates first to nth memory selection signals MS1 to MSn. The first to nth memory selection signals MS1 to MSn are transmitted to the first to nth buffer memories 421 to 42n, respectively. The first to nth buffer memories 421 to 42n are activated or inactivated by the first to nth memory selection signals MS1 to MSn, respectively.

The memory controller 410 determines one or more attributes of data to generate the first to nth memory selection signals MS1 to MSn. As described with reference to FIGS. 1 to 8, when data is included in a predetermined data group, the memory controller 410 may generate selection signals such that a buffer memory, being a nonvolatile RAM, from among the first to nth buffer memories 421 to 42n is enabled. Alternatively, as described with reference to FIGS. 1 to 8, when data is not included in a predetermined data group, the memory controller 410 may generate selection signals such that a buffer memory, being a volatile RAM, from among the first to nth buffer memories 421 to 42n is enabled.

Accordingly, the nonvolatile memory system 400 includes the plurality of buffer memories 421 to 42n which share the same interface (buffer channel 430). The memory controller 410 determines one or more attributes of data to be stored in a buffer memory and selectively stores the data in the buffer memories 421 to 42n according to the determined attribute(s). Since auxiliary power may not be required, a nonvolatile memory system having improved reliability and a reduced area may be provided.

Figure 10:
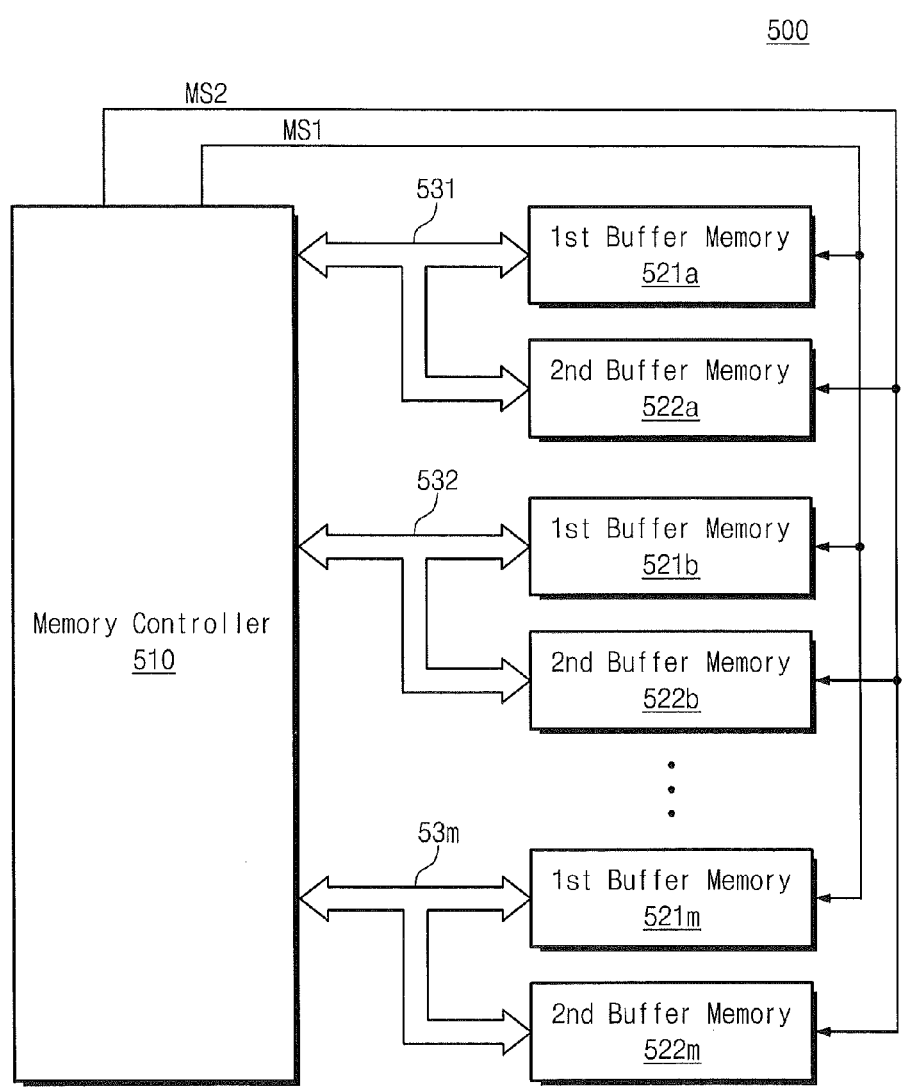
FIG. 10 is a block diagram illustrating a memory controller and a plurality of buffer memories according to embodiments of the inventive concept.

FIG. 10 is a block diagram illustrating a nonvolatile memory system 500 according to some embodiments of the inventive concept. Referring to FIG. 10, the nonvolatile memory system 500 includes a memory controller 510 and a plurality of first buffer memories 521a to 521m and a plurality of second buffer memories 522a to 522m.

The memory controller 510 determines one or more attributes of data as described, for example, with reference to FIGS. 1 to 8 and selectively stores the data in the buffer memories 521a to 521m and 522a to 522m based on the determined attribute(s).

The memory controller 510 generates first and second memory selection signals MS1 and MS2 as described, for example, with reference to FIGS. 1 to 8. The first memory selection signal MS1 is transmitted to the plurality of the first buffer memories 521a to 521m, and the second memory selection signal MS2 is transmitted to the plurality of the second buffer memories 522a to 522m.

The plurality of the first buffer memories 521a to 521m may be activated or inactivated responsive to the first memory selection signal MS1, and the plurality of the second buffer memories 522a to 522m may be activated or inactivated responsive to the second memory selection signal MS2. In some embodiments, the plurality of the first buffer memories 521a to 521m may be a volatile RAM such as a DRAM, SRAM, or SDRAM. The plurality of the second buffer memories 522a to 522m may be a nonvolatile RAM such as a PRAM, ReRAM, MRAM, or FRAM.

The first buffer memories 521a to 521m and the second buffer memories 522a to 522m are connected to the memory controller 510 through a plurality of interfaces 531 to 53m. In some embodiments, the first buffer memory 521a and the second buffer memory 522a communicate with the memory controller 510 through a first buffer channel 531. That is, the first buffer memory 521a and the second buffer memory 522a can share the first buffer channel 531.

That is, a plurality of buffer memories may be connected to the memory controller 510 through a plurality of interfaces (or, channels). At least two heterogeneous buffer memories may communicate with the memory controller 510 through an interface.

Figure 11:
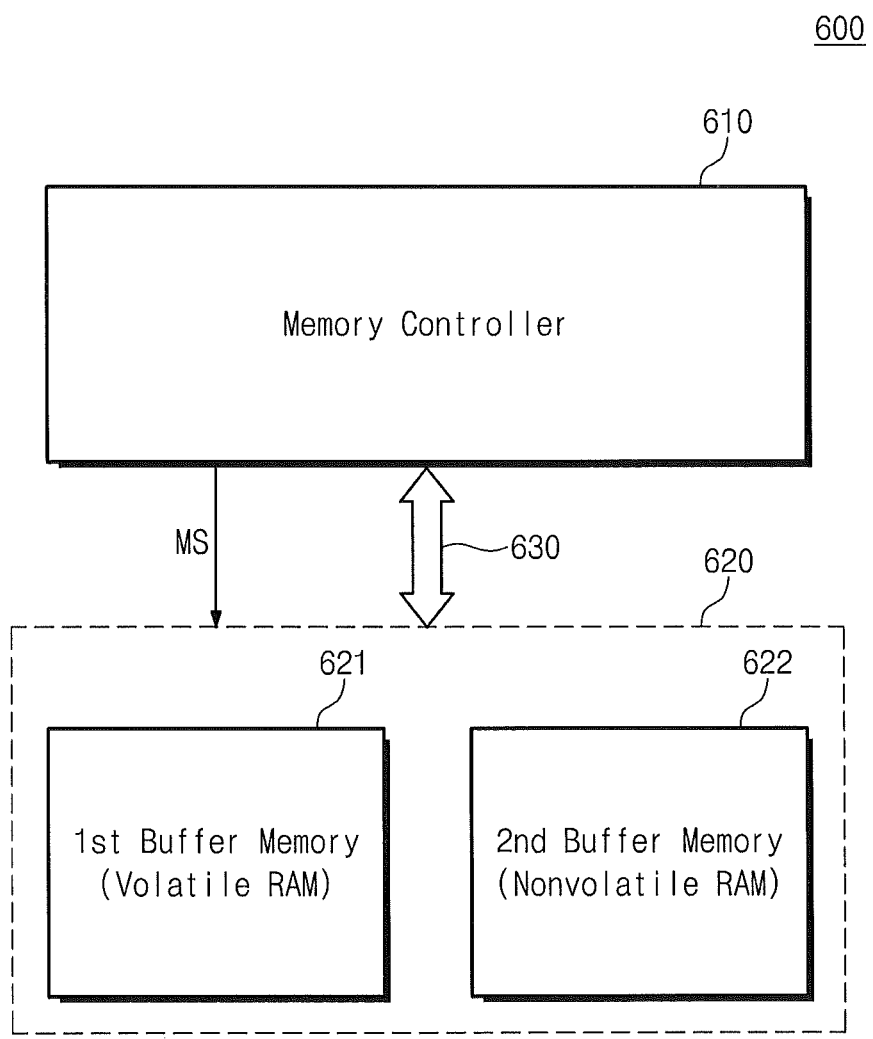
FIG. 11 is a block diagram illustrating a memory controller and a buffer unit according to embodiments of the inventive concept.

FIG. 11 is a nonvolatile memory system 600 according to some embodiments of the inventive concept. Referring to FIG. 11, a memory controller 610 communicates with a buffer unit 620 through a buffer channel 630. The buffer unit 620 includes first and second buffer memories 621 and 622.

Unlike the memory controller 110 shown in FIG. 2, the memory controller 610 shown in FIG. 11 may manage first and second buffer memories 621 and 622 using different buffer address ranges. For example, the memory controller 610 determines one or more attributes of data and allocates one or more buffer areas in which data is to be stored, based on the determined attribute(s). If data is included in a predetermined data group, the memory controller 610 may allocate the buffer area(s) such that data is stored in the second buffer memory 122, and the controller 610 sends a buffer address ADDR_b corresponding to the allocated buffer area to the buffer unit 620. The buffer unit 620 may temporarily store data in an area corresponding to the buffer address ADDR_b.

In some embodiments, the buffer unit 620 may be connected to the memory controller 610 through a buffer channel 630. The buffer channel 630 may include signal lines such as a data line, a buffer address line, and a command line.

The memory controller 610 may allocate a buffer address differently according to a data's attribute(s) such that data is selectively stored in the first or second buffer memory 621 or 622. That is, since important data may be stored in the second buffer memory (a nonvolatile RAM), a nonvolatile memory system 600 having improved reliability and a reduced area may be provided.

Figure 12:
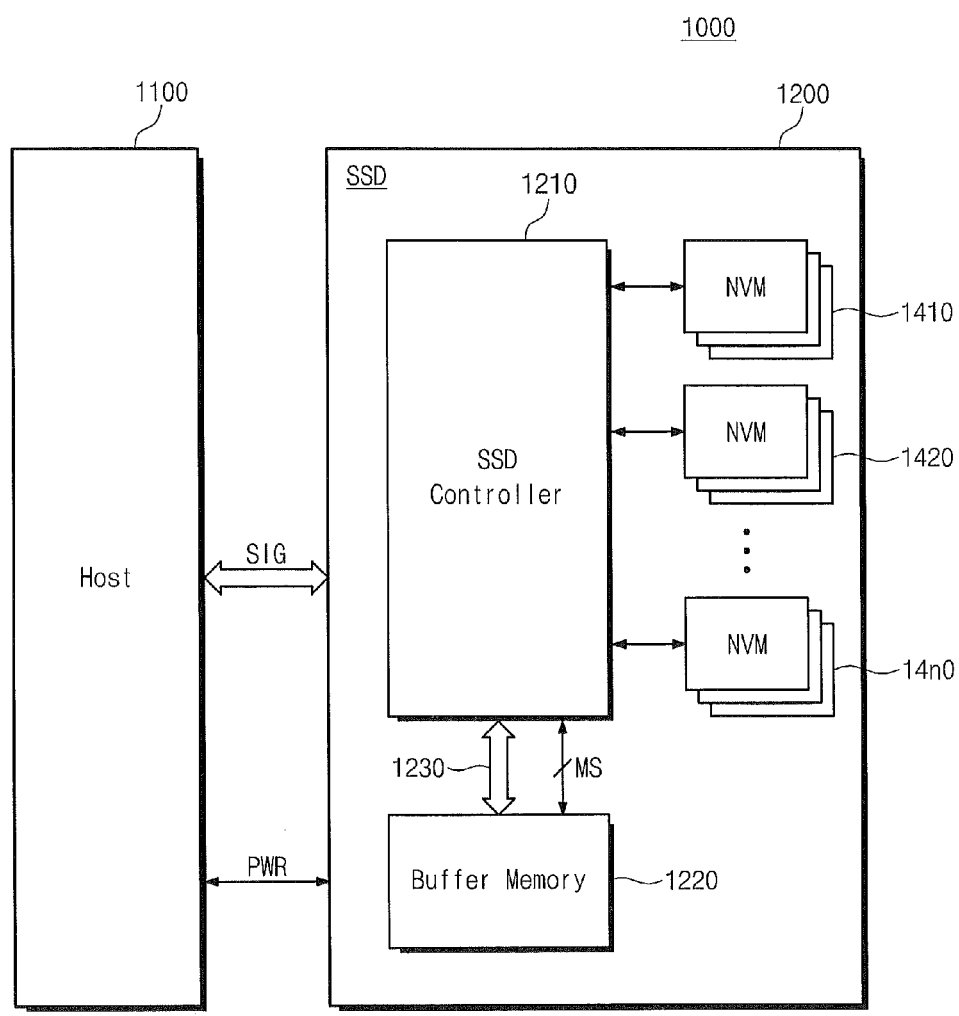
FIG. 12 is a block diagram illustrating a user system to which a nonvolatile memory system according to embodiments of the inventive concept may be applied.

FIG. 12 is a block diagram illustrating a user device 1000 to which a nonvolatile memory system 1200 according to an embodiment of the inventive concepts is applied. Here, a user device 1000 may be one of computing systems such as a ultra-mobile personal computer (UMPC), a workstation, a net-book, a personal digital assistant (PDA), a portable computer, a web tablet, a wireless phone, a mobile phone, a smart phone, an e-book, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, etc.

Referring to FIG. 12, the user device 1000 includes a host 1100 and a nonvolatile memory system 1200. The host 1100 may execute various applications such as a web browser, a game program, a word processor, an image playing program, a music playing program, a messenger program, a groupware, etc. The host 1100 reads data needed to execute various applications or stores data generated during execution of various applications in the nonvolatile memory system 1200. The host 1100 exchanges signals (e.g., a request RQ, data, and an address ADDR) with the nonvolatile memory system 1200.

The nonvolatile memory system 1200 includes an SSD controller 1210, a buffer memory 1220, and a plurality of nonvolatile memory devices 1410 to 14n0. Based on signals received from the host 1100, the memory controller 1200 writes data in the nonvolatile memory devices 1410 to 14n0 and/or reads data stored in the nonvolatile memory devices 1410 to 14n0.

Under a control of the SSD controller 1210, the buffer memory 1220 temporarily stores data received from the host and/or data read from the nonvolatile memory devices 1410 to 14n0.

In some embodiments, the buffer memory 1220 may include a volatile RAM or a nonvolatile RAM as described with reference to FIGS. 1 to 10. The buffer memory 1220 may communicate with the memory controller 1210 through a buffer channel 1230 or through two or more homogeneous buffer channels. The memory controller 1210 generates a memory selection signal MS as described with reference to FIGS. 1 to 10 and selectively stores data in the buffer memory 1220.

The host 1100 supplies power PWR to the nonvolatile memory system 1200. The nonvolatile memory system 1200 operates based on the power PWR. In some embodiments, when power supplied from the host 1100 is suddenly interrupted (or, when a sudden power-off occurs), a conventional nonvolatile memory system necessitates a separate power supply device (e.g., a tantalum capacitor, a super capacitor, or a battery) to perform an SPO backup operation (e.g., flushing of a mapping table). However, the nonvolatile memory system 1200 according to some embodiments of the inventive concept selectively stores data included in a predetermined data group in a nonvolatile RAM, so it may not require the SPO backup operation. Thus, the nonvolatile memory system 1200 according to some embodiments of the inventive concept may not necessitate an auxiliary power device.

Figure 13:
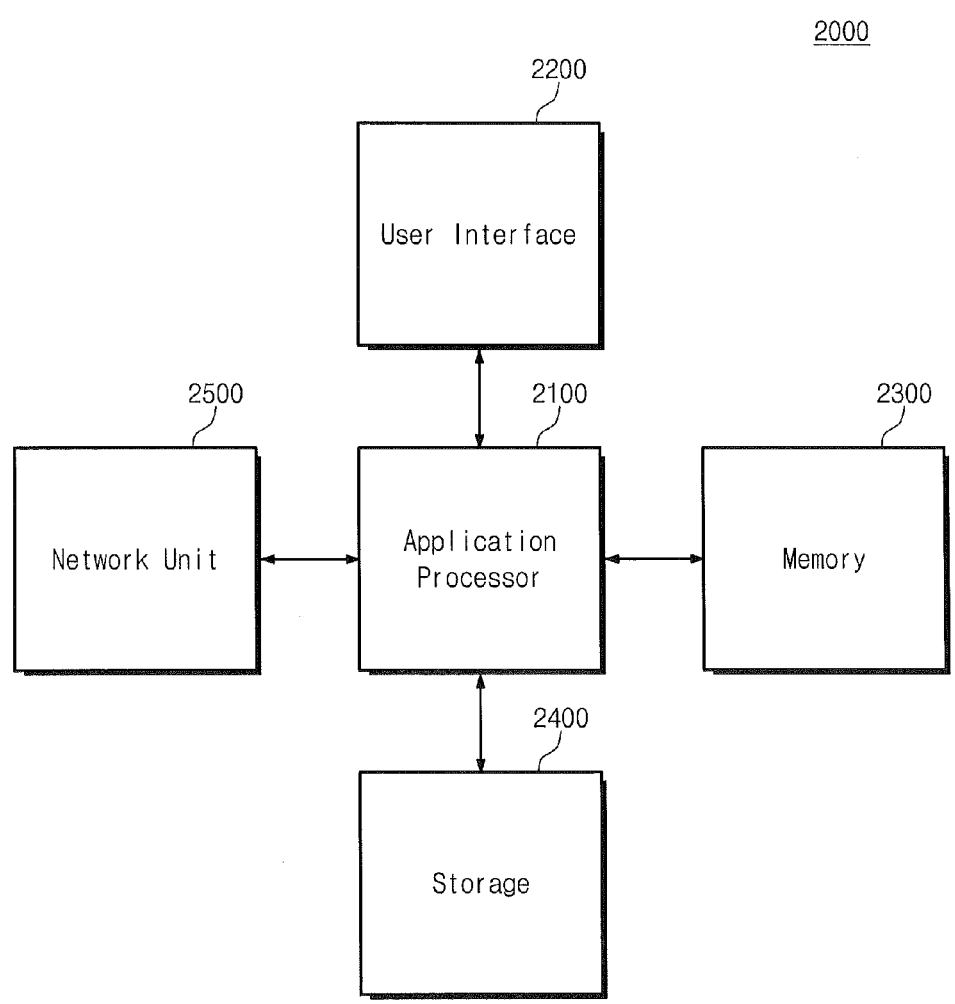
FIG. 13 is a block diagram illustrating a mobile system to which a nonvolatile memory system according to embodiments of the inventive concept may be applied.

FIG. 13 is a block diagram schematically illustrating a mobile system 2000 to which a nonvolatile memory system according to some embodiments of the inventive concept can be applied. Referring to FIG. 13, the mobile system 2000 includes an application processor 2100, a user interface 2200, a memory unit 2300, storage unit 2400, and a network unit 2500.

The application processor 2100 controls the overall operations of the mobile device 2000 and performs various calculations. The application processor 2100 can be a system-on-chip (SoC). The application processor 2100 may be a general purpose processor or an application processor. In some embodiments, the application processor 2100 may include a controller to control components of the mobile system 2000 and an interface.

The user interface 2200 may interface communications with a user under control of the application processor 2100. For example, the user interface 2200 may include user input interfaces such as a keyboard, a keypad, a button, a touch panel, a touch screen, a touch pad, a track ball, a camera, a microphone, a gyroscope sensor, a vibration sensor, etc. The user interface 2200 may further include user output interfaces such as an LCD, an OLED (Organic Light Emitting Diode) display device, an AMOLED (Active Matrix OLED) display device, an LED, a speaker, a motor, etc.

The memory 2300 exchanges data with the application processor 2100. The memory 2300 may be a main memory of the application processor 2100 or the mobile device 2000. The memory 2300 may include a volatile memory such as a Static RAM (SRAM), a Dynamic RAM (DRAM), a Synchronous DRAM (SDRAM), etc. or a nonvolatile memory such as a flash memory, a Phase-change RAM (PRAM), a Magnetic RAM (MRAM), a Resistive RAM (RERAM), a Ferroelectric RAM (FRAM), etc.

The storage 2400 may be used to store data for a long time. The storage 2400 may include a hard disk drive or a nonvolatile memory such as a flash memory, a PRAM (Phase-change RAM), an MRAM (Magnetic RAM), a RERAM (Resistive RAM), a FRAM (Ferroelectric RAM), etc.

For example, the storage 2400 can be a nonvolatile memory system described with reference to FIGS. 1 to 10. The storage 2400 may include the memory controller and the first and second buffer memories and may operate based on methods described with reference to FIGS. 1 to 10. In some embodiments, the storage 2400 may be integrated in a module, a chip, or a package.

The network unit 2500 communicates with an external device under control of the application processor 2100. For example, the network unit 2500 may communicate with the external device over a wire or wirelessly. The network unit 2500 may wirelessly communicate using at least one LTE (Long Term Evolution), WiMax, GSM (Global System for Mobile communication), CDMA (Code Division Multiple Access), Bluetooth, NFC (Near Field Communication), WiFi, RFID (Radio Frequency Identification, etc. or communicate over a wire using USB (Universal Serial Bus), SATA (Serial Advanced Technology Attachment), SCSI (Small Computer System Interface), Firewire, PCI (Peripheral Component Interconnection), etc.

As described herein, a memory controller determines one or more attributes of data and generates memory selection signals based on the determined attribute(s). A plurality of heterogeneous buffer memories may be enabled or disabled according to the memory selection signals. By storing data that is included in a predetermined data group in a nonvolatile memory, an SPO backup operation may not be required. This may mean that an auxiliary power device is unnecessary for an SPO backup. Thus, a nonvolatile memory system having improved reliability and a reduced area and its operation method may be provided.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A nonvolatile memory system comprising:
a nonvolatile memory device;
a memory controller configured to receive data from an external device and/or from the nonvolatile memory device in response to a request from the external device to provide received data, the memory controller configured to determine an attribute of the received data or an attribute of processed data generated through processing of the received data, and configured to generate first and second memory selection signals based on the attribute of the received data determined by the memory controller; and
a buffer circuit configured to temporarily store data under control of the memory controller, wherein the buffer circuit comprises:
a first buffer memory configured to communicate with the memory controller through a buffer channel, the first buffer memory configured to temporarily store the received data or the processed data in response to the first memory selection signal and under control of the memory controller; and
a second buffer memory configured to communicate with the memory controller through the buffer channel, the second buffer memory configured to temporarily store the received data and/or the processed data responsive to the second memory selection signal under control of the memory controller, and wherein the first buffer memory comprises a volatile random access memory and the second buffer memory comprises a nonvolatile random access memory.

2. The nonvolatile memory system of claim 1, wherein the buffer channel comprises a data line, an address line, and a command line.

3. The nonvolatile memory system of claim 1, wherein the first buffer memory is enabled by the first memory selection signal to temporarily store the received data and/or the processed data, and
wherein the second buffer memory is enabled by the second memory selection signal to temporarily store the received data and/or the processed data.

4. The nonvolatile memory system of claim 3, wherein when the received data and/or the processed data is determined to be included in a predetermined data group, the memory controller transmits the second memory selection signal to the second buffer memory to temporarily store the received data or the processed data.

5. The nonvolatile memory system of claim 4, wherein the predetermined data group comprises file system data, metadata, and/or mapping data.

6. The nonvolatile memory system of claim 1, wherein the memory controller comprises:
a central processing unit configured to process the received data to generate processed data, and configured to determine the attribute of the received data or processed data to generate attribute information associated with the received data and/or the processed data; and
a buffer control circuit configured to generate the first and second memory selection signals based on the attribute information.

7. The nonvolatile memory system of claim 6, wherein the buffer control circuit is configured to temporarily store the received data and/or the processed data in the first or second buffer memory according under control of the central processing unit.

8. The nonvolatile memory system of claim 1, wherein the second buffer memory comprises:
a channel adaptor circuit configured to process signals received through the buffer channel such that the second buffer memory operates based on the processed signals.

9. The nonvolatile memory system of claim 1, wherein the memory controller receives a power-on signal from the external device, reads received and/or processed data from the second buffer memory to provide read data in response to the power-on signal, and is configured to perform a boot operation based on the read data.

10. The nonvolatile memory system of claim 6, wherein the memory controller receives data attribute information associated with the data from the external device and generates the first and second memory selection signals based on the attribute information.

11. A method of operating a nonvolatile memory system including a nonvolatile memory device coupled to a first buffer memory and to a second buffer memory, the method comprising:
receiving data from an external device and/or the nonvolatile memory device in response to a request from the external device;
determining an attribute of the data to provide a determination result; and
temporarily storing the data in the first buffer and/or the second buffer memory through a buffer channel based on the determination result;
wherein the first buffer memory is a volatile random access memory and the second buffer memory is a nonvolatile random access memory.

12. The operation method of claim 11, wherein temporarily storing comprises:
generating first and/or second memory selection signals based on the determination result; and
temporarily storing the data in at least one of the first and second buffer memories in response to the first and/or second memory selection signals.

13. The operation method of claim 12, wherein determining comprises determining that the data is included in a predetermined data group, wherein generating first and/or second memory selection signals comprises:
generating the second memory selection signal to temporarily store the data in the second buffer memory.

14. The operation method of claim 11, wherein determining an attribute of the data comprises:
determining the attribute of the data based on data attribute information received from the external device, wherein the data attribute information indicates whether the data is included in a predetermined data group.

15. The operation method of claim 11, further comprising:
reading data from the second buffer memory in response to receiving a power-on signal from the external device; and
performing a boot operation based on the read data.

16. A nonvolatile memory system comprising:
a nonvolatile memory device configured to store data;
a nonvolatile memory buffer circuit configured to store data of a type that is predetermined to be flushed to the nonvolatile memory device in a sudden power off backup operation of the nonvolatile memory system;
a volatile memory buffer circuit configured to store other data of a type that is not to be flushed to the nonvolatile memory device in the sudden power off backup operation of the nonvolatile memory system; and
a memory controller coupled to the nonvolatile memory buffer circuit via a channel, and to the volatile memory buffer circuit via the channel, and to the nonvolatile memory device, the memory controller configured to store received data and/or processed data in the nonvolatile memory buffer circuit responsive to determining that the received data and/or processed data is of the type that is predetermined to be flushed to the nonvolatile memory device in the sudden power off backup operation of the nonvolatile memory system.

17. The nonvolatile memory system of claim 16 wherein the memory controller is configured to determine that the received data and/or the processed data is of the type that is predetermined to be flushed to the nonvolatile memory device in the sudden power off backup operation of the nonvolatile memory system using an attribute of the received data and/or the processed data.

18. The nonvolatile memory system of claim 17 wherein the attribute of the received data and/or the processed data indicates that the received data and/or the processed data comprises file system data, metadata, and/or mapping data.

19. The nonvolatile memory system of claim 16 wherein the memory controller is further configured to store received data and/or processed data in the volatile memory buffer circuit responsive to determining that the received data and/or processed data is of the type that is not to be flushed to the nonvolatile memory device in the sudden power off backup operation of the nonvolatile memory system.

20. The nonvolatile memory system of claim 16 further comprising:
wherein the nonvolatile memory buffer circuit or the volatile memory buffer circuit comprises a respective channel adaptor circuit configured to process signals received over the channel to a protocol used by the nonvolatile memory buffer circuit or the volatile memory buffer circuit.

* * * * *